Sept. 3, 1968  H. J. HARP, JR  3,399,427
APPARATUS FOR MAKING A HOLLOW ELONGATED PLASTIC ARTICLE
Original Filed July 23, 1964  2 Sheets-Sheet 1
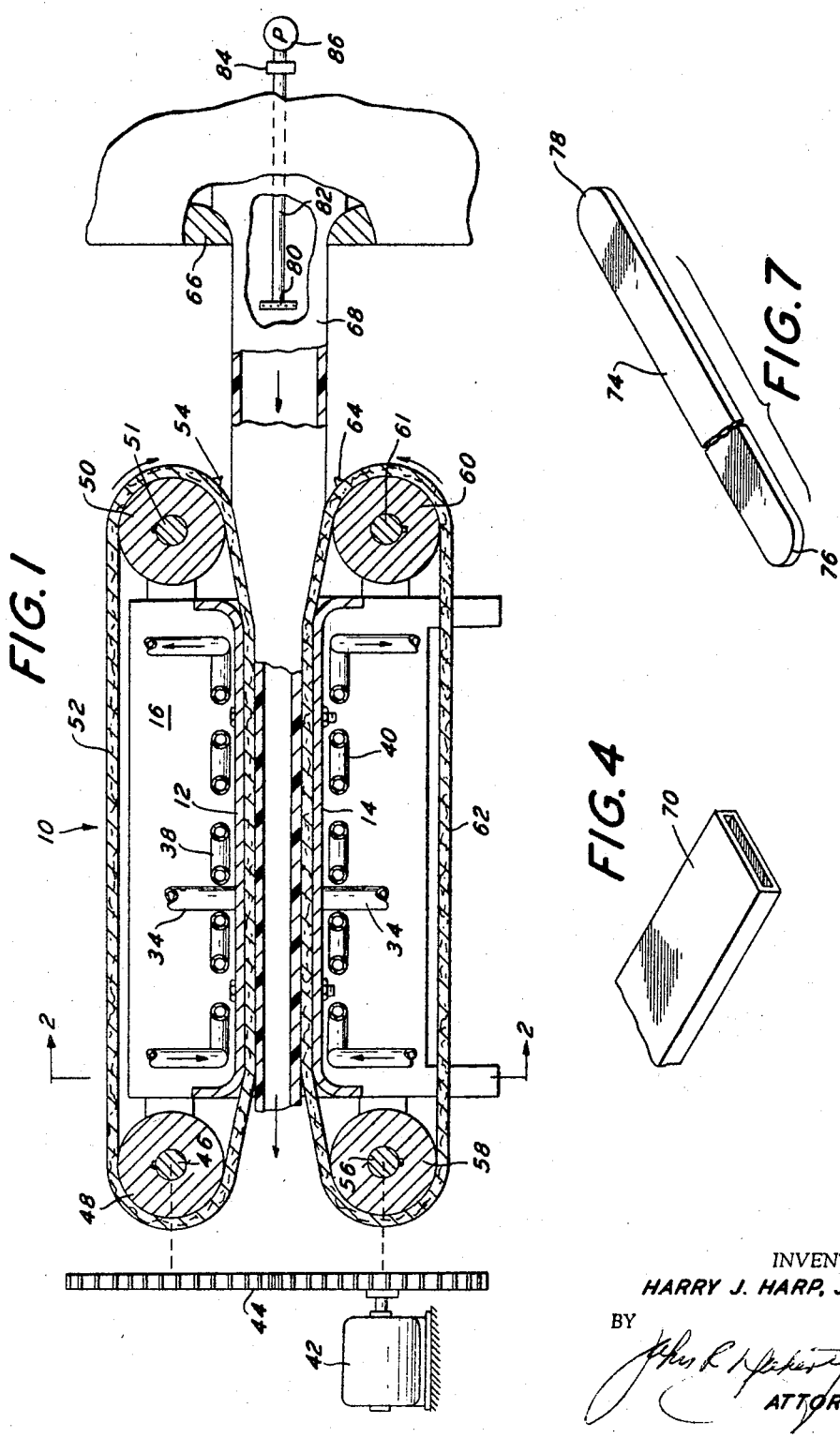
INVENTOR.
HARRY J. HARP, JR.
BY
ATTORNEY

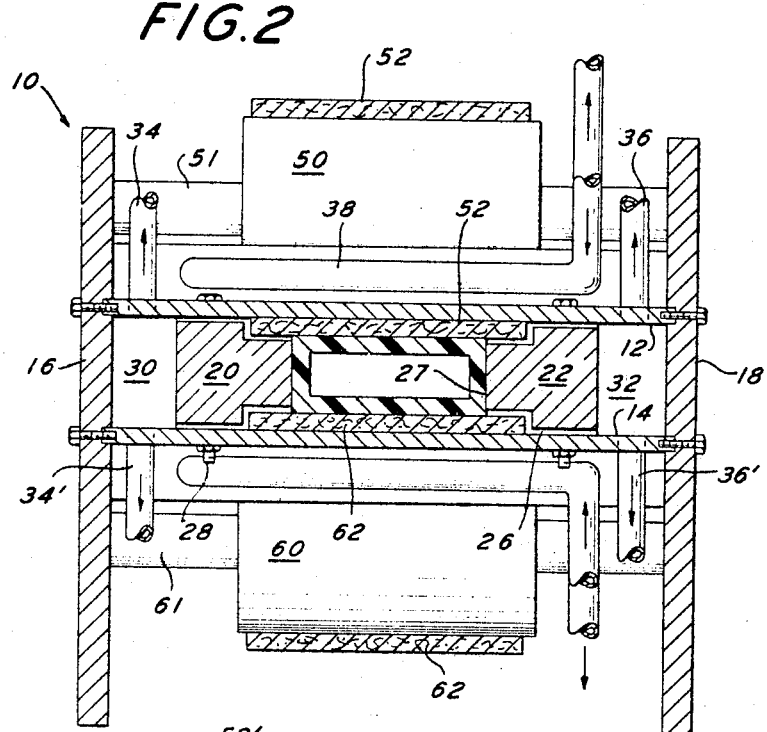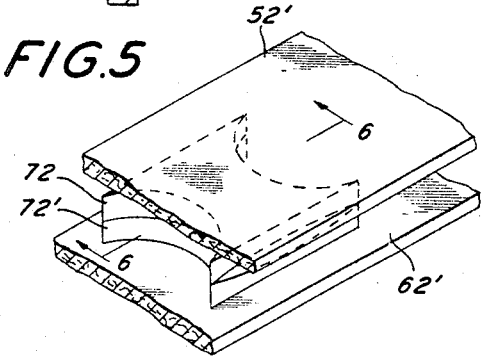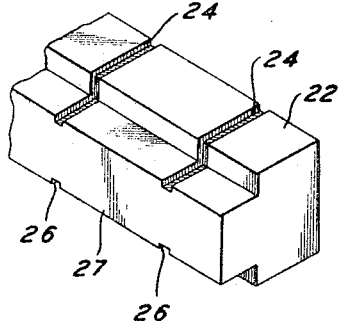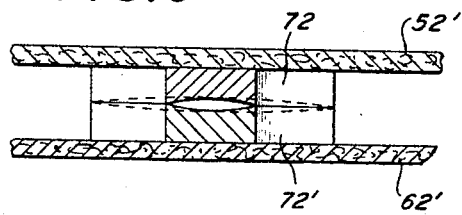

United States Patent Office 3,399,427
Patented Sept. 3, 1968

3,399,427
APPARATUS FOR MAKING A HOLLOW ELONGATED PLASTIC ARTICLE
Harry J. Harp, Jr., Jenkintown, Pa., assignor to Union Carbide Corporation, a corporation of New York
Application July 23, 1964, Ser. No. 387,265, now Patent No. 3,274,313, dated Sept. 20, 1966, which is a continuation-in-part of application Ser. No. 191,811, May 2, 1962. Divided and this application July 22, 1966, Ser. No. 567,267
2 Claims. (Cl. 18—14)

ABSTRACT OF THE DISCLOSURE

Apparatus for producing a biaxial orientated, thin wall, hollow elongated article of plastic material comprising an extruder for forming a hollow tubular member and a die forming housing having disposed therein a pair of endless belts for pulling the hollow tubular member through a passage formed thereby and vacuum means for applying a vacuum to the hollow tubular member and for reshaping it to cross-sectional shape of the finished product. Cooling means are also provided within the die forming housing for cooling the tubular member as it is being reformed. The pair of endless belts are operated at a greater linear rate of speed than that at which the hollow tubular member is extruded in order to stretch the hollow tubular member in the longitudinal direction prior to entering the die forming housing.

---

This application is a division of my copending application Ser. No. 387,265, filed on July 23, 1964, now Patent No. 3,274,313, issued Sept. 20, 1966, which in turn is a continuation-in-part of my earlier copending application Ser. No. 191,811, filed on May 2, 1962, now abandoned.

This invention relates to hollow articles of manufacture suitable for use as drinking straws and to apparatus for making such articles.

The product of the present invention is a hollow substantially rectangular tubular member having substantially uniform wall thickness. The product of the present invention is made from a rigid, biaxial orientated plastic material such as polystyrene, polyethylene, polyvinyl chloride, etc., and possesses a strength approximately two to three times that of the same thickness of the material produced by conventional methods. The product of the present invention may be a combined drinking straw and mixer which has many advantages over drinking straws proposed heretofore.

Heretofore, drinking straws were primarily made from a paper material having a wax or other coating thereon to render the same waterproof. However, the drinking straw was easily collapsible and tended to collapse at the end portion thereof which is disposed within the user's mouth. In addition to the high strength of the product of the present invention, the rectangular shape of the product lends itself to use as a drinking straw since it has a thickness which is substantially less than the width thereof. Hence, the user's lips need not be parted to the same degree required with a conventional circular drinking straw, with both straws having the same flow capacity. As a result of the rigidity of the straw of the present invention, the straw will not readily collapse and has sufficient rigidity so that it may be used as a mixer to stir the liquids which are to be siphoned through the straw.

The product of the present invention which is suitable for use as a drinking straw is made by forming a hollow tubular member of a biaxial orientatable plastic material and then stretching the tubular member in the longitudinal direction while it is in a readily deformable state while at the same time feeding the tubular member to and through a noncircular passage partially defined by moving endless belts. The hollow tubular member is then reshaped in the transverse direction by applying a vacuum to a plurality of spaced points along the passage and around the periphery of the passage in one plane normal to the direction of the passage. Biaxial orientation of the tubular material so achieved by reshaping in both the longitudinal and transverse directions results in increased strength of the hollow product of the present invention.

The apparatus of the present invention includes a pair of endless belts which partially define an evacuated passage through which the drinking straw will be formed. The apparatus of the present invention preferably includes an extruder or other source of plastic material capable of being readily deformed as a result of the application of a vacuum to the corners of the passage through which the plastic material will be directed.

It is an object of the present invention to provide a novel apparatus for making a drinking straw from a plastic material.

It is another object of the present invention to provide a novel apparatus for making a hollow rigid plastic member having a substantially rectangular cross sectional shape with a substantially uniform wall thickness.

Other objects will appear hereinafter.

For the purpose of illustrating the invention there is shown in the drawings forms which are presently preferred; it being understood, however, that this invention is not limited to the precise arrangements and instrumentalities shown.

FIGURE 1 is a longitudinal sectional view of the apparatus of the present invention.

FIGURE 2 is a sectional view taken along the lines 2—2 in FIGURE 1.

FIGURE 3 is a partial perspective view of a spacer employed in the apparatus illustrated in FIGURES 1 and 2.

FIGURE 4 is a partial perspective view of a product made by the apparatus of the present invention.

FIGURE 5 is a partial perspective view of juxtaposed portions of endless conveyor belts in accordance with another embodiment of the present invention.

FIGURE 6 is a sectional view taken along the lines 6—6 in FIGURE 5.

FIGURE 7 is a perspective view of a product made in accordance with the apparatus illustrated in FIGURES 5 and 6.

Referring to the drawing in detail, wherein like numerals indicate like elements, there is shown in FIGURE 1 an apparatus designated generally as 10. The apparatus 10 includes a die forming housing having a top wall 12 and a bottom wall 14. The walls 12 and 14 are juxtaposed to and spaced from each other as shown more clearly in FIGURE 2. As shown more clearly in FIGURE 1, the leading and trailing edges of the walls 12 and 14 are curved or rounded edges. The walls 12 and 14 are maintained in spaced relation with respect to each other by means of side walls 16 and 18. The side edges of the walls 12 and 14 are received within grooves in the walls 16 and 18 and fixedly secured thereto by means of bolts.

A pair of shims or spacers 20 and 22 extend for the full length of the walls 12 and 14 and are disposed therebetween. As shown more clearly in FIGURE 2, the spacers 20 and 22 are spaced from each other and the side walls 16 and 18.

As shown more clearly in FIGURE 3, each of the spacers 20 and 22 will be provided with spaced grooves 24 along a top surface thereof and spaced grooves 26 along a bottom surface thereof. The purpose for the grooves 24 and 26 will be made clear hereinafter. The spacer 22 is provided with a face surface 27. The spacer 20 is provided with a similar face surface juxtaposed to and spaced from surface 27. The last mentioned face surfaces partially define a passage through the housing. Bolts 28 extend through the top wall 12, each of the spacers 20 and 22, the bottom wall 14 to fixedly secure the spacers with respect to the walls 12 and 14.

A vacuum manifold 30 is provided between the spacer 20 and the side wall 16. A vacuum manifold 32 is provided between the spacer 22 and the side wall 18. Pipes 34 and 36 extend upwardly from the manifolds 30 and 32, respectively, for connection to a source of vacuum (not shown). Similarly, pipes 34' and 36' depend from the manifolds 30 and 32, respectively, for connection to said source of vacuum.

Cooling coils 38 are juxtaposed to the upper surface of the top wall 12 and extend back and forth in serpentine fashion from the leading edge thereof to the trailing edge thereof. Similar cooling coils 40 are juxtaposed to the lowermost surface on the bottom wall 14. The purpose of the cooling coils 38 and 40 will be made clear hereinafter.

A motor 42 is supported in any convenient location adjacent the housing. Motor 42 is provided with an output sprocket meshingly engaged with a chain 44. The chain 44 extends around a sprocket which in turn is coupled to a horizontally disposed shaft 46. As shown more clearly in FIGURE 1, the drive pulley 48 is secured to the shaft 46. The shaft 46 and the pulley 48 are rotatably supported adjacent the trailing edge of the top wall 12. The ends of the shaft 46 are rotatably supported in bushings mounted on a bracket supported from the side walls 16 and 18.

A pulley 50 and shaft 51 are similarly supported adjacent the leading edge of the top wall 12 in a manner identical with the support for the pulley 48 and shaft 46. An endless belt 52 extends around the pulleys 48 and 50. The belt 52 is made from a material which will not readily adhere to moldable plastic resins. To accomplish this desirable characteristic, the belt 52 may be a fabric belt having an outer layer of Teflon thereon. The belt 52 may have a drag pin 54 secured thereto for a purpose to be made clear hereinafter. As shown more clearly in FIGURE 2, the width of the belt 52 is substantially greater than the distance between the face surfaces of the spacers 20 and 22. The Teflon coated surface of the belt 52 cooperates with the face surfaces on the spacers 20 and 22 to partially form the passage through the housing.

The sprocket for the motor 42 is coupled to a shaft 56 rotatably supported below the uppermost surface of the wall 14 in the same manner as shaft 46. A pulley 58 is secured to the shaft 56. Since shafts 46 and 56 are coupled to the motor 42, they will rotate at the same rate of speed but in opposite directions. A pulley 60 is supported by a shaft 61 in the same manner as pulley 50 and shaft 51. As shown more clearly in FIGURE 1, the pulley 60 and shaft 61 are below and in front of the leading edge of the wall 14. Also, the pulley 50 and shaft 51 are above and in front of the leading edge of the wall 12. Shafts 46 and 56 lie in the same plane. Shafts 51 and 61 lie in the same plane. All of the above mentioned pulleys are of the same diameter.

A belt 62, identical with belt 52, extends around the pulleys 58 and 60. The belt 62 may be provided with a drag pin 64 for a purpose to be made clear hereinafter. As shown more clearly in FIGURE 1, the width of belt 62 is identical with the width of belt 52. The Teflon coated surface of belt 62 cooperates with the Teflon coated surface of belt 52 and the face surfaces of the spacers 20 and 22 to define a rectangular passage through the housing of the apparatus 10. Each of the belts 52 and 62 have their side edges guided by means of the juxtaposed vertical and horizontal surfaces illustrated in FIGURE 1.

As indicated above, both of the pulleys 50 and 60 are disposed in front of the leading edges of the walls 12 and 14, and are positioned respectively above and below these leading edges as more clearly shown in FIGURE 1. Thus, belts 52 and 62 at the entrance to the housing of apparatus 10 form a generally rectangular cross section, inwardly tapered opening for purposes to be hereinafter explained. Although not shown in the drawings, the rectangular passage defined by the face surfaces of the spacers 20 and 22 is slightly larger in cross section than the smallest dimension or neck of the opening provided by belts 52 and 62 at the entrance to the housing of apparatus 10.

An extruder 66 is shown diagrammatically in FIGURE 1 juxtaposed to but spaced from the leading edge of the housing of the apparatus 10. Plastic material is extruded from the extruder 66 in a conventional manner in the shape of a hollow tubular member 68. The hollow tubular member 68 is continuously fed through the space (approx. one foot in length) between the extruder 66 and the housing of apparatus 10 and then to and through the passage defined by the belts 52 and 62 and the face surfaces on the spacers 20 and 22 of apparatus 10.

The operation of the apparatus illustrated in FIGURES 1–3 is as follows:

Readily deformable, biaxial orientatable plastic material, such as polystyrene, is extruded from the extruder 66 and fed through the rectangular passage in the housing. The continuously moving belts 52 and 62 and their drag pins 54 and 64 mechanically pull the hollow tubular member 68 through the passage and through the space between the extruder 66 and the housing, thereby causing the tubular member 68 to be stretched in the longitudinal direction. Due to this stretching action, the tubular member 68 is reduced in cross section and the inwardly tapered surfaces of the opening formed by the belts 52 and 62 as hereinabove described serve to guide the tubular member and to preshape it to the dimensions of the rectangular passage in the housing. As the hollow tubular member 68 moves through the housing, the member 68 is reshaped or stretched in the transverse direction (the rectangular passage being slightly larger in cross section than the neck of the opening as indicated above) due to the application of vacuum to the corners of the passage at spaced points along the passage. The effect of the cooling coils 38 and 40 assist in cooling the plastic material as it is being reshaped in the passage so that a rigid plastic tubular member, such as a drinking straw 70 illustrated in FIGURE 4, is continuously being produced by the apparatus 10.

Because of the biaxial orientation of the plastic material achieved by reshaping of the hollow tubular member 68 in both longitudinal and transverse directions, it will be appreciated that by reason of the orientation phenomena a rigid plastic tubular member of high strength is produced. In order to achieve biaxial orientation, several factors are important. Obviously, the rate of linear speed of the belts 52 and 62 should be greater than the extrusion rate of the extruder 66 in order to effect the necessary forces to reshape or stretch the hollow tubular member 68 in the longitudinal direction. Generally, the linear rate of speed of the belts 52 and 62 will depend on the wall thickness of the plastic tubular member to be produced. However, the speed of the belts 52 and 62 should in no event be so great as to stretch the tubular member beyond the point at which it will burst, it being readily deformable and easily ruptured. For heavy wall thicknesses, a relatively low rate of speed is suitable. Conversely, for thinner wall thickness, a relatively high rate of speed is necessary. Illustratively, a rectangular plastic tubular member suitable for use as a drinking straw having a cross sectional dimension of 0.375 by 0.100 inch and having a wall thickness of between about 0.012 inch and 0.015 inch can be produced with present apparatus when the extruder feed rate is 29 feet per minute and when the belts 52 and 62 are moving at a linear speed of about 75 feet per minute.

Another important factor is the temperature at which the plastic material is maintained during the reshaping operation. For best results, this temperature should be kept at or near the orientation temperature of the particular material employed; for example, about 90 to 100° C. in the case of polystyrene.

It will be noted from the direction of the arrows in FIGURE 1 that the cold water or equivalent coolant medium is introduced at the downstream end of the apparatus 10 and flows toward the upstream end in a direction opposite to the direction of the movement of the plastic material. Hence, while the hollow tubular member 68 or straw 70 will have completely solidified before emerging from the outlet of the apparatus 10, the tubular member 68 is nonetheless readily deformable and maintained at or near the orientation temperature as it is fed through the opening end of the passage in apparatus 10. It will, of course, be understood that the coolant medium may be introduced at the upstream end of the apparatus 10 so long as the proper temperature gradient along the cooling coils 38 and 40 is maintained for the particular plastic material used.

In order to prevent the hollow tubular plastic member 68 from collapsing within the space between the apparatus 10 and the extruder 66, it has been found desirable, if not necessary in some cases, to introduce air under a small pressure within the tubular member 68 at the point where it emerges from the extruder 66. This can be conveniently accomplished by a nozzle 80 positioned within the orifice of the extruder 66. The nozzle 80 is at one end of a conduit 82. The other end of the conduit 82 is connected to a pump 86 and has a meter 84 therein. The pump 86 and meter 84 permit only a waft of air to be introduced into the hollow tubular plastic member 68 as illustrated in FIGURE 1. It is extremely important that the pressure discharged through nozzle 80 does not blow up or distort the tubular member 68. Acordingly, it has been found desirable to utilize a meter 84 which permits the air discharged from the nozzle 80 to have a pressure which is slightly greater than atmospheric pressure. For example, the pressure of the air discharged through the nozzle 80 will have a pressure of approximately 0.25 ounce per square inch above atmospheric pressure and will have a flow rate of approximately 10 liters per minute.

The vacuum applied on the hollow tubular member 68 in accordance with the invention should be sufficient to cause the member to be drawn against the surfaces of the passage in the apparatus 10 and to reshape it to the desired final dimensions of the straw 70. Generally, the vacuum applied will depend on several factors for instance, the overall size of the tubular member 68, its wall thickness and the air pressure maintained within the tubular member 68 in order to prevent its collapse. In no event, however, should the vacuum be so great as to effect a substantially large drag on the tubular member 68 as it passes through the passage of the apparatus 10. For manufacturing straws 70 of a wall thickness and cross sectional dimension indicated above, a vacuum of about 4 to 6 inches of Hg is suitable with air pressures of approximately 0.25 ounce per square inch above atmospheric pressure. It is, of course, important that the vacuum, and more particularly the differential pressure across the hollow tubular member 68 within the passage, be maintained throughout the entire operation of the apparatus 10.

Due to the elongated nature of the hollow cross section of the straw 70, the straw 70 more readily facilitates the support thereof within a user's mouth. It is to be noted that the straw 70 may be continuously manufactured in accordance with the apparatus and method of the present invention. A cutting apparatus, not shown, may be utilized to cut the endless product of the apparatus 10 into uniform lengths. Due to the rigidity of the straw 70, it may be utilized as a mixer as well as a drinking straw.

If desired, the endless product produced by the apparatus 10 of the present invention may be modified so as to produce discrete hollow tubular members having closed ends. This desirable feature may be accomplished by attaching jaw plates 72 and 72' to the belts 52' and 62', respectively. The belts 52' and 62' are identical with the belts 52 and 62, respectively, except for the elimination of the drag pins. The jaw plates 72 and 72' are secured to the belts 52' and 62' in any convenient manner so that they mate with one another as they pass between the walls 12 and 14.

As shown more clearly in FIGURES 5 and 6, the jaw plates 72 and 72' are provided with curved ends and a recessed central portion so that the upper edge of the curved ends is a sharp cutting surface. As the material is fed through the housing by means of the contact between the moving belts 52' and 62' as described above, the jaw plates 72 and 72' mate with one another and cut the hollow tubular member into discrete members 74 having closed ends 76 and 78. The members 74 may be utilized in a wide variety of products and may perform a wide variety of functions such as reinforcement members for undergarments, popsicle sticks, etc.

It has been found that the belts 52, 52', 62 and 62' need not have a Teflon coating thereon. That is an ordinary fabric or rubber belt may be utilized. The belts 52 and 62 need not have drag pins thereon. Instead, a mechanical puller may be provided to the left of the apparatus 10 in FIGURE 1 to mechanically pull the endless hollow straw 70 through the housing. It will be appreciated that belts 52 and 62 could be eliminated and stationary walls substituted therefor. It has been found that the use of the belts 52 and 62 materially reduces the drag on the plastic material due to the effect of the vacuum. Accordingly, the pull necessary by a mechanical puller is substantially less.

At present, an operative embodiment of the present invention is producing straws 70 at the rate of one hundred feet per minute. The thickness of the walls of the straw 70 are maintained substantially uniform between .012 inch, and .015 inch.

From the foregoing, it will be seen that the present invention provides for the manufacture of a hollow, thin wall, substantially rectangular tubular product capable of use as a drinking straw by stretching a tube of readily deformable, biaxial orientable plastic material in the longitudinal direction and by reshaping the tube in the transverse direction through the use of a vacuum applied to the tube at spaced points along a passage through which it is continuously drawn. The product so produced in accordance with the invention possesses a strength of approximately two to three times that of the same thickness of material produced by conventional methods. In the prior art, large diameter tubing or pipe has been made according to the phenomena of orientation, but such processes employ the use of high internal air pressures to reshape the tube in the transverse direction as it is being formed and consequently they are limited to the manufacture of relatively thick wall structures. In comparison thereto, the product of the present invention can be made in most any size suitable for use as a drinking straw and with a wall thickness within the general range of from about 0.004 inch to 0.050 inch.

While the present invention has been disclosed herein for illustrative purposes with reference to a preferred embodiment of a hollow, rectangular cross section tubular member of uniform wall thickness such as might be used as a combined drinking straw and mixer, it must be understood that the invention is not limited to the manufacture of such articles alone and that the apparatus and method described herein may equally as well be employed in the manufacture of hollow articles of various shapes and cross sections and of non-uniform wall thickness as will be apparent to those skilled in the art.

I claim:

1. Apparatus for producing a biaxial orientated thin wall, hollow, elongated, rectangular article of plastic material comprising, in combination: an extruder for forming a hollow tubular member and a die forming housing for reshaping and forming the hollow tubular member to the rectangular shape of the finished article to be produced, said die forming housing being juxtaposed in aligned relation with the outlet of said extruder but being spaced therefrom a sufficient distance to allow for longitudinal stretching of the tubular member prior to entering said die forming housing, said die forming housing including a pair of spacer members having flat rectangular walls and a pair of endless belts mounted in spaced relation at the top and bottom of said spacer members defining an elongated rectangular shaped passage within said die forming housing, vacuum means communicating with the corners of said passage for applying a vacuum against the surfaces of the hollow tubular member at spaced points along said passage and for reshaping the hollow tubular member in the traverse direction to the rectangular shape defined by said passage, and cooling means provided along said passage for cooling the tubular member as it is being reformed within said passage, means for introducing low pressure air into the hollow tubular member which pressure is just sufficient to support the hollow tubular member and to prevent its collapse while passing through the space between said extruder and said die forming housing, and means for operating said pair of endless belts at a greater rate of linear speed than that at which the hollow tubular member is extruded thereby causing the hollow tubular member to be stretched in the longitudinal direction while passing through the space between said extruder and said die forming housing prior to entering said passage defined within said die forming housing.

2. Apparatus in accordance with claim 1 in which said vacuum means includes a vacuum chamber communicating with said passage at spaced points therealong by means of grooves provided within the walls of said spacer members.

References Cited
UNITED STATES PATENTS

| | | | |
|---|---|---|---|
| 3,243,850 | 4/1966 | Zieg | 18—14 |
| 3,298,064 | 1/1967 | Jun-Taga | 18—14 |

WILLIAM J. STEPHENSON, *Primary Examiner.*